(12) United States Patent
Asai et al.

(10) Patent No.: US 12,200,846 B2
(45) Date of Patent: Jan. 14, 2025

(54) HIGH-FREQUENCY HARDENING APPARATUS

(71) Applicant: Mitsubishi Power, Ltd., Yokohama (JP)

(72) Inventors: Kunio Asai, Tokyo (JP); Keiko Shishime, Tokyo (JP); Shuichi Ishizawa, Tokyo (JP); Takeshi Kudo, Yokohama (JP); Yurika Nagai, Yokohama (JP); Katsumi Tanaka, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 763 days.

(21) Appl. No.: 17/433,325

(22) PCT Filed: Jun. 26, 2020

(86) PCT No.: PCT/JP2020/025292
§ 371 (c)(1),
(2) Date: Aug. 24, 2021

(87) PCT Pub. No.: WO2021/039090
PCT Pub. Date: Mar. 4, 2021

(65) Prior Publication Data
US 2022/0159791 A1 May 19, 2022

(30) Foreign Application Priority Data
Aug. 28, 2019 (JP) .................................. 2019-155199

(51) Int. Cl.
*H05B 6/06* (2006.01)
*C21D 1/10* (2006.01)
(Continued)

(52) U.S. Cl.
CPC ............... *H05B 6/06* (2013.01); *H05B 6/102* (2013.01); *C21D 1/10* (2013.01); *C21D 9/0068* (2013.01)

(58) Field of Classification Search
CPC . H05B 6/06; H05B 6/102; H05B 6/40; C21D 1/10; C21D 1/70; C21D 9/00; C21D 9/0068
(Continued)

(56) References Cited

U.S. PATENT DOCUMENTS

2010/0012230 A1   1/2010  Baur et al.
2010/0329884 A1*  12/2010  Asai .......................... C21D 1/10
                                                    416/241 R (Continued)

FOREIGN PATENT DOCUMENTS

CN      101821691 A    *  9/2010
CN      101936190         1/2011
(Continued)

OTHER PUBLICATIONS

International Search Report issued Sep. 8, 2020 in corresponding International Application No. PCT/JP2020/025292, with English Translation.
(Continued)

*Primary Examiner* — Vy T Nguyen
(74) *Attorney, Agent, or Firm* — Wenderoth, Lind & Ponack, L.L.P.

(57) ABSTRACT

This high-frequency hardening apparatus is provided with: an induction heating coil which has a U-shaped part that sandwiches a turbine blade, a pair of linear parts, and a connection part connecting the U-shaped part and the linear parts; a temperature detection unit which detects, in a non-contact manner, temperature around the induction heating coil; a moving mechanism which relatively moves the
(Continued)

turbine blade and the induction heating coil in the direction of blade height; an electrical current supply unit which supplies a high-frequency electrical current to the induction heating coil; and a control device which has an electrical current control unit that, on the basis of a detection value provided by the temperature detection unit, controls the magnitude of the high-frequency electrical current supplied from the electrical current supply unit such that the detection value will not exceed a predetermined temperature.

10 Claims, 4 Drawing Sheets

(51) Int. Cl.
    *C21D 9/00*        (2006.01)
    *H05B 6/10*        (2006.01)

(58) Field of Classification Search
    USPC .......................................... 219/635; 416/241
    See application file for complete search history.

(56) References Cited

U.S. PATENT DOCUMENTS

2011/0072834 A1*   3/2011   Ishikura ............... G05D 23/192
                                                                     62/3.2

2015/0251250 A1    9/2015   Schlick et al.
2018/0279421 A1    9/2018   Herrera Caballero et al.

FOREIGN PATENT DOCUMENTS

| | | |
|---|---|---|
| DE | 2215240 | 9/1973 |
| DE | 10 2008 005 234 | 7/2009 |
| DE | 10 2018 204 327 | 9/2018 |
| EP | 2 267 278 | 12/2010 |
| JP | 63-10431 | 1/1988 |
| JP | 8-291983 | 11/1996 |
| JP | 2005-226539 | 8/2005 |
| JP | 2005-307307 | 11/2005 |
| JP | 2005-330520 | 12/2005 |
| JP | 2011-001575 | 1/2011 |
| JP | 2011-7093 | 1/2011 |
| JP | 2011-63831 | 3/2011 |
| JP | 2013-104103 | 5/2013 |
| JP | 5920871 | 5/2016 |
| JP | 2016166543 A * | 9/2016 |

OTHER PUBLICATIONS

Written Opinion of the International Searching Authority issued Sep. 8, 2020 in corresponding International Application No. PCT/JP2020/025292, with English Translation.

* cited by examiner

HIGH-FREQUENCY HARDENING APPARATUS

TECHNICAL FIELD

The present disclosure relates to a high-frequency hardening apparatus.

Priority is claimed on Japanese Patent Application No. 2019-155199 filed on Aug. 28, 2019, the content of which is incorporated herein by reference.

BACKGROUND ART

A steam turbine includes a rotor that is provided with a plurality of rotor blade stages over an area from a high-pressure side to a low-pressure side and a stator that covers the rotor from an outer peripheral side and is provided with a plurality of stator blade stages at an inner peripheral surface. A high-temperature and high-pressure steam guided from an upstream side is guided by the stator blade stages and collides with the rotor blade stages thereafter to apply a rotational drive force to the rotor. A rotational energy of the rotor is extracted from a shaft end and is used to drive an external machine such as a generator.

Here, the temperature of the steam decreases toward a low-pressure stage on a downstream side, and thus there is a high probability that the steam condenses and droplets are generated at the low-pressure stage. When such droplets collide with a turbine blade at a high speed, erosion may occur at a surface of the turbine blade. For example, a technique is known in which a surface of a turbine blade is subjected to hardening processing through quenching in order to avoid occurrence of erosion as described in PTL 1 below. In a method related to PTL 1, quenching processing is performed by irradiating the surface of the turbine blade with a laser beam.

CITATION LIST

Patent Literature

[PTL 1] Japanese Unexamined Patent Application Publication No. 2005-226539

SUMMARY OF INVENTION

Technical Problem

However, in the case of the above-described method, it is difficult to control a laser irradiation heating temperature, and thus the maximum heating temperature may vary depending on the location. In particular, if a heating temperature is excessively high, the toughness of the turbine blade may be reduced.

The present disclosure has been made to solve the above-described problems, and an object thereof is to provide a high-frequency hardening apparatus with which it is possible to perform temperature control more easily and appropriately.

Solution to Problem

In order to solve the above-described problems, the present disclosure provides a high-frequency hardening apparatus including an induction heating coil that includes a U-shaped portion that sandwiches a leading edge of a turbine blade, a pair of linear portions that sandwiches the turbine blade, and a connecting portion that connects the U-shaped portion and the linear portions to each other on a convex side and a concave side of the turbine blade, a temperature detection unit that detects a temperature of the leading edge of the turbine blade in a vicinity of the induction heating coil in a non-contact manner, a moving mechanism that moves the turbine blade and the induction heating coil relative to each other in a blade height direction of the turbine blade, an electrical current supply unit that supplies a high-frequency electrical current to the induction heating coil, and a control device that includes an electrical current controller, the electrical current controller controlling a magnitude of the high-frequency electrical current from the electrical current supply unit based on a detection value of the temperature detection unit such that the detection value does not exceed a predetermined temperature.

Advantageous Effects of Invention

According to the present disclosure, it is possible to provide a high-frequency hardening apparatus with which it is possible to perform temperature control more easily and appropriately.

DESCRIPTION OF EMBODIMENTS

First Embodiment

Hereinafter, a turbine blade 1 and a high-frequency hardening apparatus 100 according to a first embodiment of the present disclosure will be described with reference to FIGS. 1 to 6.

(Configuration of Turbine Blade)

Figure 1:
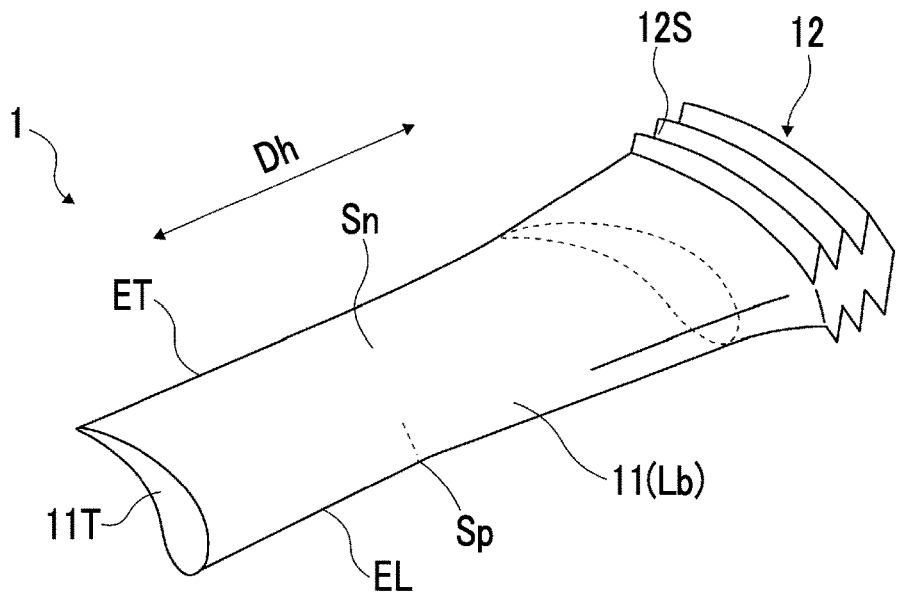
FIG. 1 is a view showing a configuration of a turbine blade, which is a processing target of a high-frequency hardening apparatus according to an embodiment of the present disclosure.

The turbine blade 1 is used as a low-pressure stage rotor blade of a steam turbine, for example. As shown in FIG. 1, the turbine blade 1 includes a blade body 11 and a blade root 12. The blade body 11 extends in a blade height direction Dh, and the sectional shape thereof as seen in the blade height direction Dh is an airfoil-like shape. Specifically, a section of the blade body 11 has an arc shape extending from a trailing edge ET to a leading edge EL. In addition, one (concave surface Sp) of two surfaces connecting the leading edge EL and the trailing edge ET to each other is recessed in a curved surface shape. The other of (convex surface Sn) the surfaces is swollen in a curved surface shape. A black coating film Lb is formed on the surface of the blade body 11. The black coating film Lb is a thin film formed of a black paint.

Furthermore, the blade body 11 is three-dimensionally twisted from one side toward the other side in the blade height direction Dh. Specifically, the blade body 11 is twisted in a circumferential direction around the blade height direction Dh from a tip 11T side toward the blade root 12 side. Therefore, a direction in which a straight line (chord line) connecting the leading edge EL and the trailing edge ET to each other extends changes from the tip 11T side toward the blade root 12 side. The blade root 12 is provided with a serration 12S, of which the sectional shape is like fir-tree serrations, so that the blade body 11 is attached to a blade groove formed on a disk (not shown) of the rotor.

(Configuration of High-Frequency Hardening Apparatus)

Figure 2:
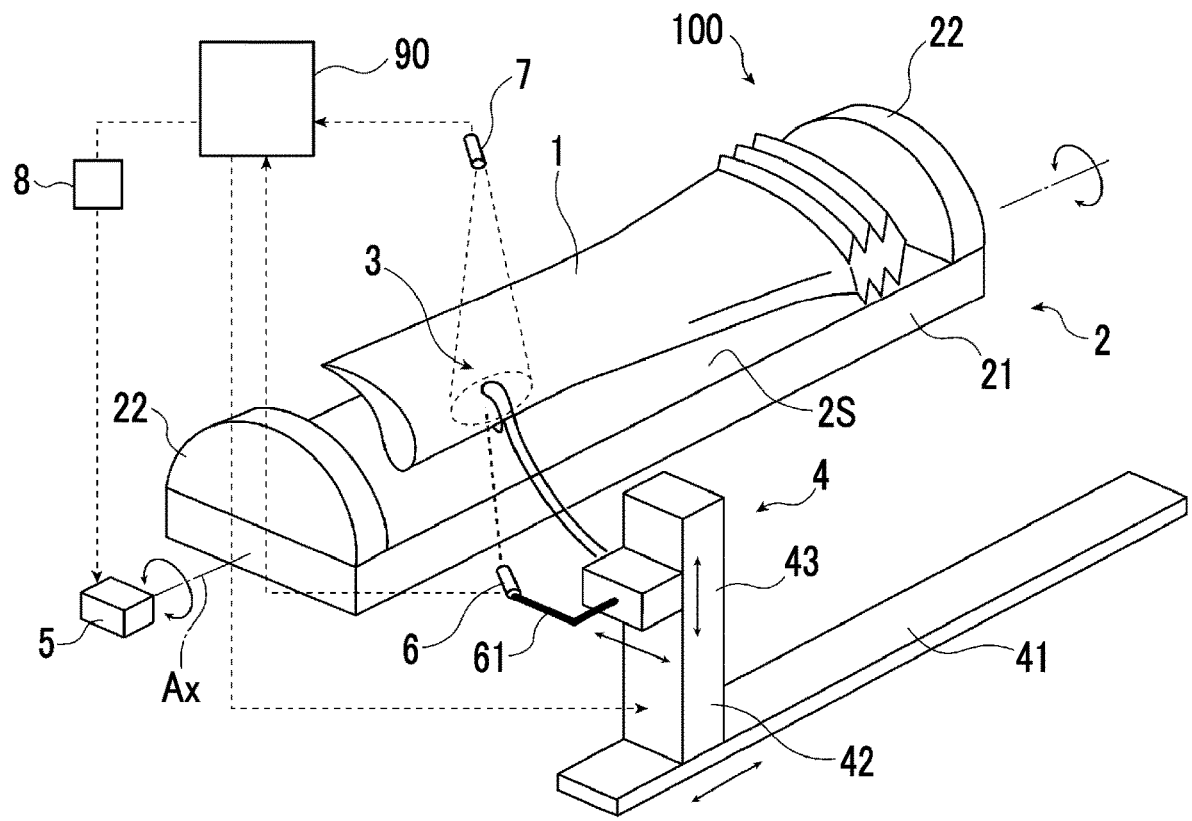
FIG. 2 is a view showing a configuration of the high-frequency hardening apparatus according to the embodiment of the present disclosure.

The high-frequency hardening apparatus 100 performs hardening processing with respect to the turbine blade 1 through quenching. As shown in FIG. 2, the high-frequency hardening apparatus 100 includes a stand 2, an induction heating coil 3, a moving mechanism 4, a rotating mechanism 5, a temperature detection unit 6, an alarm temperature detection unit 7, an electrical current supply unit 8, and a control device 90.

The stand 2 has a stand body 21 having a plate shape for supporting the turbine blade 1 and fixation members 22 respectively provided on both ends of the stand body 21. On a mounting surface 2S of the stand 2, the turbine blade 1 is immovably fixed by the fixation members 22 from both sides in the blade height direction Dh. When being fixed to the stand 2, the turbine blade 1 is in a state in which the convex surface Sn faces an upper side.

(Configuration of Induction Heating Coil)

Figure 3:
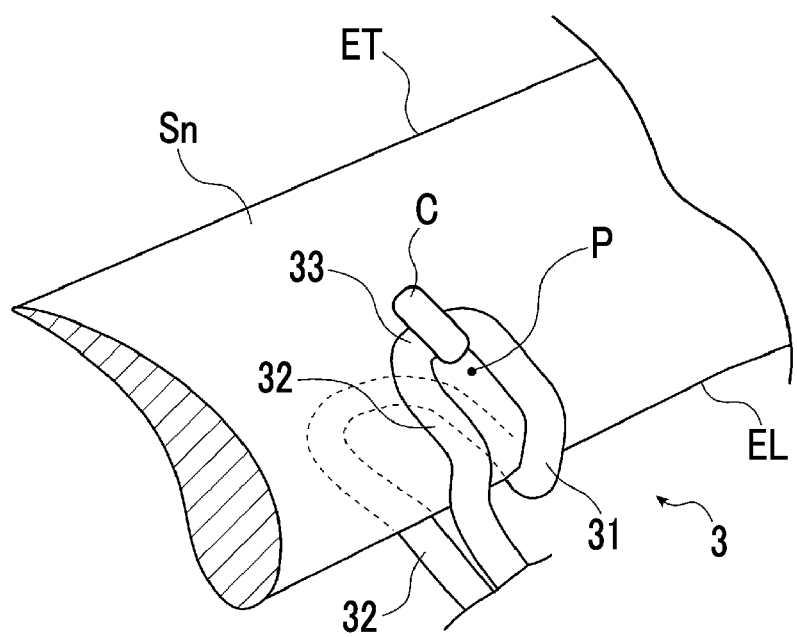
FIG. 3 is a view showing a configuration of an induction heating coil according to the embodiment of the present disclosure.

The induction heating coil 3 performs quenching by performing heating processing on the leading edge EL of the turbine blade 1 fixed onto the stand 2 by means of a high-frequency electrical current supplied from the electrical current supply unit 8. As shown in FIG. 3, the induction heating coil 3 includes a U-shaped portion 31, linear portions 32, and connecting portions 33. The U-shaped portion 31 sandwiches an edge on the leading edge EL side from both sides in a thickness direction. The U-shaped portion 31 is curved in a U-shape to extend from the convex surface Sn side to the concave surface Sp side via the leading edge EL. It is desirable that the U-shaped portion 31 extends from the leading edge EL to the trailing edge ET by one-third of the chord length.

The linear portions 32 are provided on both sides of the turbine blade 1 to form a pair and extend to be parallel with the U-shaped portion 31 while being separated from the U-shaped portion 31 in the blade height direction Dh. Note that, being "parallel" means being substantially parallel, and design tolerances and manufacturing errors are allowed. The connecting portions 33 connect end portions of the U-shaped portion 31 that are on the trailing edge ET side and end portions of the linear portions 32 that are on the trailing edge ET side to each other in the blade height direction Dh. In addition, an iron core C is provided at an intermediate position on the connecting portion 33 on the convex surface Sn side. The iron core C is provided to increase a magnetic flux density of a magnetic field generated by the induction heating coil 3. The induction heating coil 3 may be in contact with a surface of the turbine blade 1 and may be disposed with a slight gap provided therebetween.

(Configuration of Moving Mechanism)

As shown in FIG. 2, the moving mechanism 4 supports the induction heating coil 3 and moves the induction heating coil 3 in the blade height direction Dh. Specifically, the moving mechanism 4 includes a rail 41 extending in the blade height direction Dh, a first moving portion 42 movable along the rail 41, and a second moving portion 43 supported by the first moving portion 42. The first moving portion 42 extends upward from the rail 41. A second moving portion 43 is provided on a surface of the first moving portion 42 that is on one side in the blade height direction Dh. The second moving portion 43 is movable vertically along the first moving portion 42. The above-described induction heating coil 3 is supported by the second moving portion 43. The induction heating coil 3 extends from the second moving portion 43 toward the turbine blade 1. When the first moving portion 42 is moved, the induction heating coil 3 moves relative to the turbine blade 1 in the blade height direction Dh. Furthermore, when the second moving portion 43 is moved, the induction heating coil 3 moves relative to the turbine blade 1 in the vertical direction. Although details will be described later, the operation of the moving mechanism 4 is controlled by the control device 90.

(Configuration of Rotating Mechanism)

Here, as described above, the turbine blade 1 is three-dimensionally twisted from the one side toward the other side in the blade height direction Dh. Therefore, there is a probability that relative positions of the induction heating coil 3 and the turbine blade 1 cannot be maintained if only the moving mechanism 4 is provided. Therefore, the high-frequency hardening apparatus 100 according to the present embodiment is provided with the rotating mechanism 5 that rotates the stand 2. The rotating mechanism 5 can rotate the stand 2 around a rotation axis Ax extending in the blade height direction Dh. The operation of the rotating mechanism 5 is controlled by the control device 90 which will be described later.

(Temperature Detection Unit)

Next, the temperature detection unit 6 will be described. The temperature detection unit 6 detects the temperature of a portion of the turbine blade 1 that is in the vicinity of the induction heating coil 3. More specifically, as shown in FIG. 3, a position (detection point P) where the temperature detection unit 6 detects the temperature is within a region surrounded by the U-shaped portion 31, the linear portion 32, and the connecting portion 33 on the convex surface Sn. That is, the temperature detection unit 6 detects a local temperature on the convex surface Sn. As the temperature detection unit 6, an optical fiber type radiation temperature sensor capable of detecting the temperature of the detection point P in a non-contact manner is preferably used. In addition, the temperature detection unit 6 is supported and fixed with respect to the above-described moving mechanism 4 (second moving portion 43) via a supporting part 61. Therefore, when the moving mechanism 4 is moved, the temperature detection unit 6 moves relative to the turbine blade 1 together with the induction heating coil 3. The value of a temperature (detection value) detected by the temperature detection unit 6 is transmitted to the control device 90 in the form of an electric signal.

(Configuration of Alarm Temperature Detection Unit)

The alarm temperature detection unit 7 is another detection device provided separately from the temperature detection unit 6 described above. The alarm temperature detection unit 7 detects a temperature distribution in a range wider than a temperature detection target range of the temperature detection unit 6. The above-described detection point P is within this range. As the alarm temperature detection unit 7, an optical fiber type radiation temperature sensor is also preferably used. The value of a temperature (detection value for alarm) detected by the alarm temperature detection unit 7 is transmitted to the control device 90 in the form of an electric signal.

(Configuration of Control Device)

Figure 4:
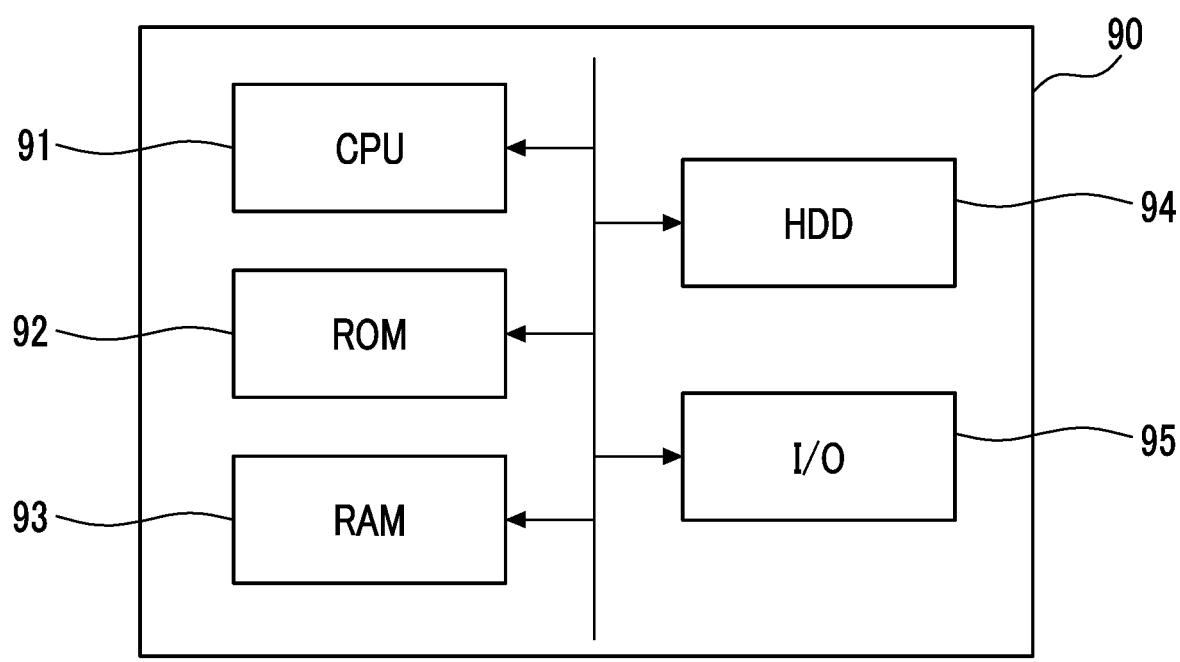
FIG. 4 is a hardware configuration diagram of a control device according to the embodiment of the present disclosure.

As shown in FIG. 4, the control device 90 is a computer that includes a central processing unit (CPU) 91, a read only memory (ROM) 92, a random access memory (RAM) 93, a hard disk drive (HDD) 94, and a signal receiving module 95 (I/O: Input/Output). The signal receiving module 95 receives electric signals (each detection value) from the temperature detection unit 6 and the alarm temperature detection unit 7. The signal receiving module 95 may receive an amplified signal via, for example, a charge amplifier or the like.

Figure 5:
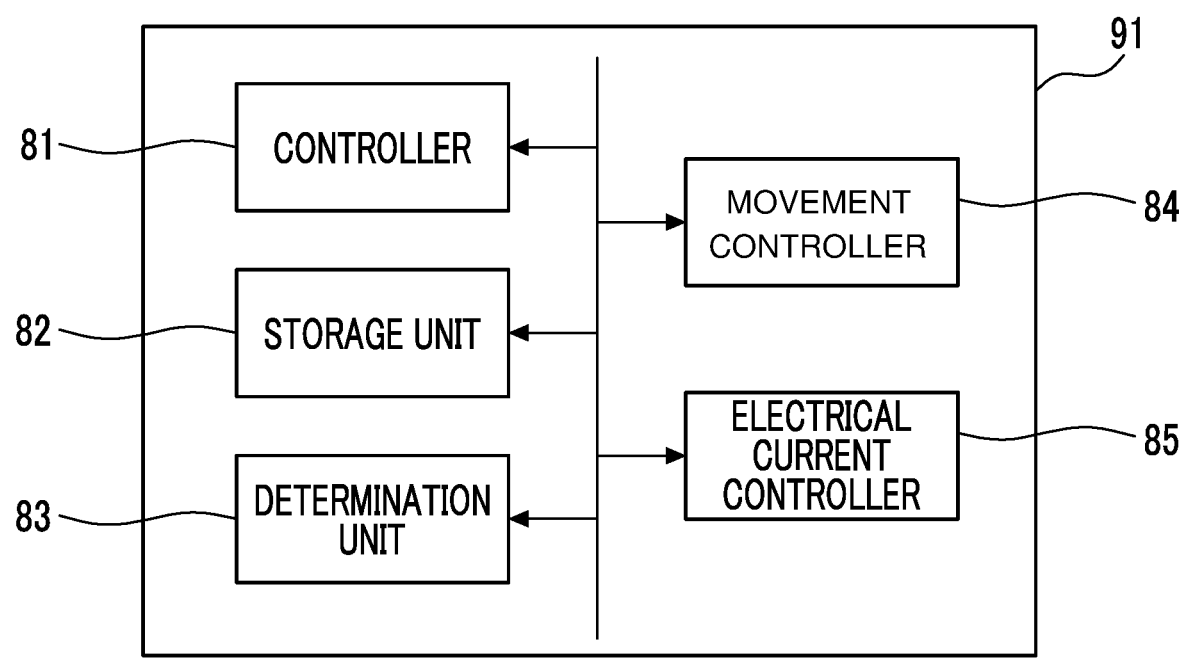
FIG. 5 is a functional block diagram of the control device according to the embodiment of the present disclosure.

As shown in FIG. 5, the CPU 91 of the control device includes a controller 81, a storage unit 82, a determination unit 83, a movement controller 84, and an electrical current controller 85 by executing a program that is stored therein in advance. The controller 81 controls other functional units provided in the control device 90. The storage unit 82 stores a threshold value (upper limit value) for each detection value of the temperature detection unit 6 and the alarm temperature detection unit 7 described above. Furthermore, the storage unit 82 stores a table showing a relationship between position coordinates in the blade height direction of the turbine blade 1 and a twist angle of the turbine blade 1. The determination unit 83 determines whether or not each detection value exceeds the threshold value. The electrical current controller 85 controls the magnitude of a high-frequency electrical current supplied from the electrical current supply unit 8 to the induction heating coil 3 based on a result of determination performed by the determination unit 83.

(Operation of Control Device)

Figure 6:
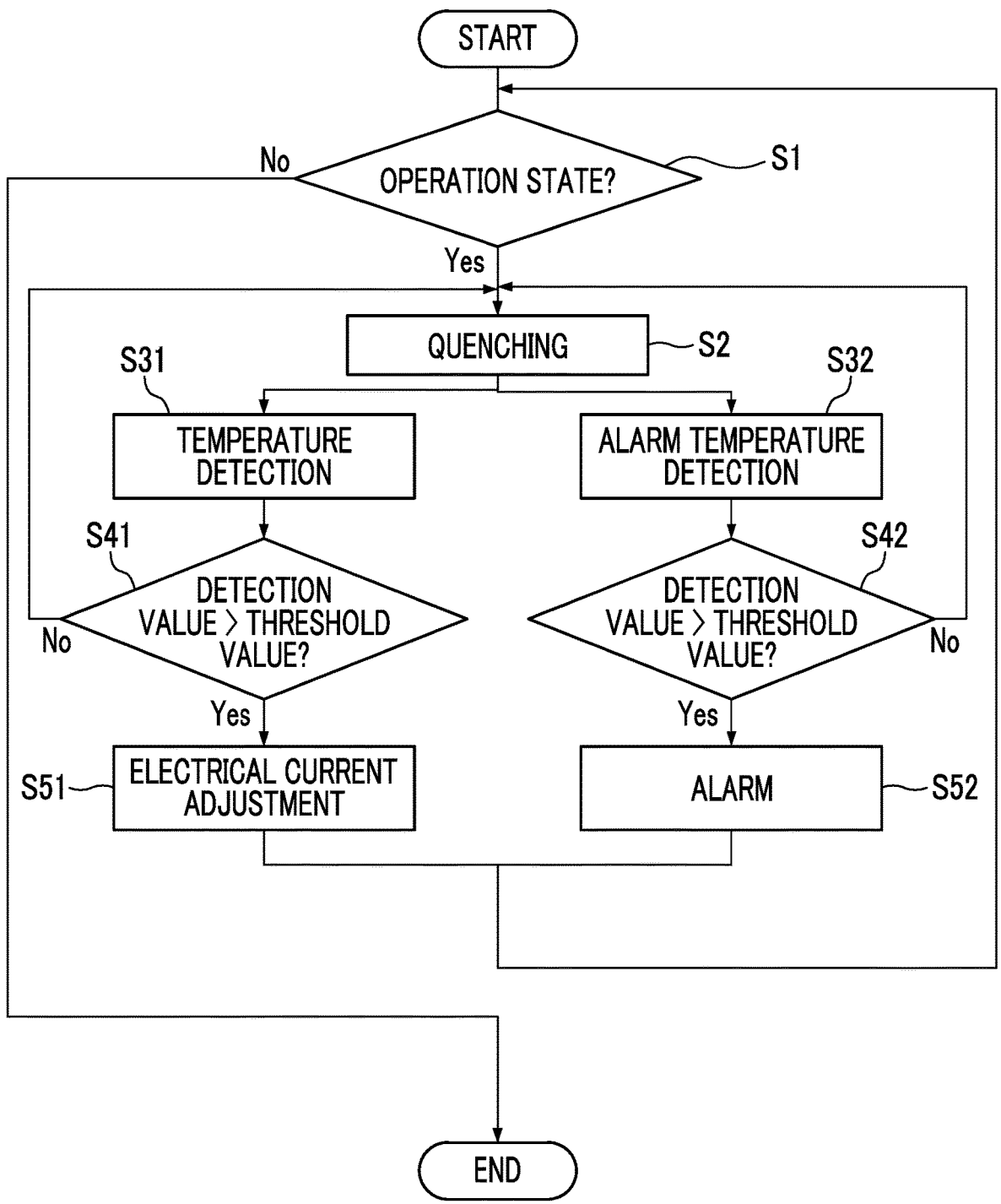
FIG. 6 is a flowchart showing the operation of the control device according to the embodiment of the present disclosure.

Next, an example of processing performed by the control device 90 will be described with reference to FIG. 6. As shown in the figure, the processing includes an operation determination step S1, a quenching step S2, a temperature detection step S31, an alarm temperature detection step S32, a first determination step S41, a second determination step S42, an electrical current adjustment step S51, and an alarm step S52.

In the operation determination step S1, it is determined whether or not the high-frequency hardening apparatus 100 is in a state of being operated under supervision of the temperature detection unit 6 and the alarm temperature detection unit 7. In a case where it is determined that the high-frequency hardening apparatus 100 is not in an operation state, the processing is terminated (step S1: No). On the other hand, in a case where it is determined that the high-frequency hardening apparatus 100 is in the operation state (step S1: Yes), the quenching step S2, which is a subsequent step, is performed.

In the quenching step S2, quenching is performed by means of a high-frequency electrical current supplied to the induction heating coil 3 from the electrical current controller 85. At this time, the movement controller 84 controls the operations of the moving mechanism 4 and the rotating mechanism 5 while referring to the above-described table stored in the storage unit 82. That is, the moving mechanism 4 moves the induction heating coil 3 in the blade height direction Dh along the leading edge EL, and the rotating mechanism 5 rotates the stand 2 based on the twist angle of the leading edge EL. When the quenching step S2 is performed once, quenching is performed for a predetermined time or a predetermined movement distance. After the predetermined time elapses or the quenching is finished for the predetermined movement distance, the temperature detection step S31 and the alarm temperature detection step S32 are performed in parallel.

In the temperature detection step S31, the temperature detection unit 6 detects the temperature of the above-described detection point P which is set on the convex surface Sn of the turbine blade 1. After the temperature detection step S31, the first determination step S41 is performed. In the first determination step S41, it is determined whether or not a detection value obtained in the temperature detection step S31 exceeds a predetermined value.

In a case where it is determined in the first determination step S41 that the detection value exceeds the predetermined value (step S41: Yes), the electrical current adjustment step S51, which is a subsequent step, is performed. In the electrical current adjustment step S51, the controller 81 issues a command to the electrical current controller 85 to reduce the magnitude of the electrical current. Accordingly, the heating temperature of the induction heating coil 3 is lowered. After the electrical current adjustment step S51, the processing returns to the quenching step S2 described above. Accordingly, quenching is performed again for a predetermined time or a predetermined moving distance.

On the other hand, in a case where it is determined in the first determination step S41 that the detection value does not exceed the predetermined value (step S41: No), the processing returns to the above-described quenching step S2 again without the electrical current adjustment step S51 being performed. Accordingly, quenching is performed again for a predetermined time or a predetermined distance. Such a cycle is repeated over the entire leading edge EL.

In the alarm temperature detection step S32, the alarm temperature detection unit 7 detects a temperature distribution in a relatively wide range including the above-described detection point P which is set on the convex surface Sn of the turbine blade 1. After the alarm temperature detection step S32, the second determination step S42 is performed. In the second determination step S42, it is determined whether or not a portion of which the temperature exceeds a predetermined value (alarm threshold value) is present within a detection target range obtained in the alarm temperature detection step S32.

In a case where it is determined in the second determination step S42 that the detection target range includes a portion where the predetermined value is exceeded (step S42: Yes), the alarm step S52, which is a subsequent step, is performed. In the alarm step S52, by means of sound, light, or the like, an administrator is notified or warned that the temperature is on the rise. It is also possible to adopt a configuration in which an electrical current supplied from the electrical current controller 85 is cut off in the alarm step S52. After the alarm step S52, the processing returns to the quenching step S2 described above. Accordingly, quenching is performed again for a predetermined time or a predetermined distance.

On the other hand, in a case where it is determined in the second determination step S42 that the detection target range does not include a portion where the predetermined value is exceeded (step S42: No), the processing returns to the above-described quenching step S2 again without the alarm step S52 being performed. Accordingly, quenching is performed again for a predetermined time or a predetermined distance. Such a cycle is repeated over the entire leading edge EL.

(Action and Effect)

According to the above-described configuration, the turbine blade 1 is subjected to quenching processing in a state where the leading edge EL of the turbine blade 1 is sandwiched by the U-shaped portion 31 of the induction heating coil 3. Accordingly, in comparison with a case where a step of locally performing quenching processing is repeated, quenching can be finished more uniformly. Furthermore, the temperature detection unit 6 is configured to detect the temperature of the vicinity of the induction heating coil 3 in a non-contact manner. As a result, the influence of the temperature detection unit 6 itself on the detection value can be suppressed in comparison with a case where the temperature is detected by, for example, a contact type device. That is, it is possible to achieve an increase in detection accuracy.

In addition, the control device 90 controls the magnitude of a high-frequency electrical current supplied to the induction heating coil 3 based on the detection value of the temperature detection unit 6. Therefore, it is possible to reduce a probability that the heating temperature of the induction heating coil 3 becomes excessively high.

According to the above-described configuration, the temperature detection unit 6 detects the temperature of a portion (detection point P) of the leading edge EL that is on a convex side (convex surface Sn side) of the turbine blade 1 and that is surrounded by the U-shaped portion 31 and the linear portion 32. Accordingly, the temperature of a portion where the heating temperature of the induction heating coil 3 is highest can be obtained as the detection value. The control device 90 controls the amount of electrical current supplied to the induction heating coil 3 such that the detection value does not exceed a predetermined value. Therefore, it is possible to further reduce a probability that the heating temperature of the induction heating coil 3 becomes excessively high.

According to the above-described configuration, in a case where the turbine blade 1 has a three-dimensionally twisted shape, the turbine blade 1 can be rotated around the rotation axis Ax extending in the blade height direction Dh by the rotating mechanism 5. Accordingly, it is possible to maintain a relative distance between the induction heating coil 3 and the leading edge EL without moving the induction heating coil 3 itself. Therefore, the heating temperature can be controlled with a higher accuracy.

According to the above-described configuration, since the temperature detection unit 6 is an optical fiber type radiation temperature sensor, the temperature detection unit 6 is less likely to be influenced by an induced electrical current generated by the induction heating coil 3. Accordingly, temperature detection of the temperature detection unit 6 can be realized with an even higher accuracy.

According to the above-described configuration, the alarm temperature detection unit 7 is provided in addition to the temperature detection unit 6. The alarm temperature detection unit 7 detects a temperature distribution in a wider range than the temperature detection unit 6. The control device 90 issues an alarm in a case where the temperature distribution includes a value higher than the alarm threshold value. That is, in the above-described configuration, in a case where the heating temperature of the induction heating coil 3 becomes excessively high even in just a part, a warning can be issued to the administrator not to perform further heating. Accordingly, quenching processing can be performed on the turbine blade more uniformly and more accurately.

According to the above-described configuration, the black coating film Lb is formed on the surface of the turbine blade 1. The temperature detection unit 6 detects the temperature of a surface of the black coating film Lb. Accordingly, in comparison with a case where, for example, a metallic material is exposed at the surface of the turbine blade 1, a variation in emissivity of heat from the surface can be suppressed. Accordingly, temperature detection can be performed with an even higher accuracy.

According to the above-described configuration, a region surrounded by the linear portion 32 and the U-shaped portion 31 is formed on the surface of the turbine blade 1. Accordingly, a high-temperature state is maintained in the surrounded region. Accordingly, quenching processing can be performed efficiently and uniformly.

Here, in the case of the turbine blade 1, erosion is likely to occur particularly at one-third of a portion from the leading edge EL in a chord direction (direction connecting leading edge EL and trailing edge ET). According to the above-described configuration, it is possible to actively perform quenching processing on such a portion. Accordingly, the turbine blade 1 having an even higher durability can be obtained.

Other Embodiments

Hereinabove, the embodiment of the present disclosure has been described in detail with reference to the drawings. However, a specific configuration is not limited to the embodiment, and design changes can be made without departing from the gist of the present disclosure. Note that, in the above-described embodiment, a configuration in which the induction heating coil 3 and the temperature detection unit 6 are moved in the blade height direction Dh by the moving mechanism 4 has been described. However, it is also possible to adopt a configuration in which the stand 2 is moved in the blade height direction Dh by the moving mechanism 4. In this case, the configuration of the apparatus can be simplified.

<Appendix>

The high-frequency hardening apparatus described in each embodiment is understood as follows, for example.

(1) The high-frequency hardening apparatus 100 according to a first aspect includes the induction heating coil 3 that includes the U-shaped portion 31 that sandwiches the leading edge EL of the turbine blade 1, the pair of linear portions 32 that sandwiches the turbine blade 1, and the connecting portion 33 that connects the U-shaped portion 31 and the linear portions 32 to each other on a convex side and a concave side of the turbine blade 1, the temperature detection unit 6 that detects the temperature of the leading edge EL of the turbine blade 1 in the vicinity of the induction heating coil 3 in a non-contact manner, the moving mechanism 4 that moves the turbine blade 1 and the induction heating coil 3 relative to each other in the blade height direction Dh of the turbine blade 1, the electrical current supply unit 8 that supplies a high-frequency electrical current to the induction heating coil 3, and the control device 90 that includes the electrical current controller 85, the electrical current controller 85 controlling the magnitude of the high-frequency electrical current from the electrical current supply unit 8 based on a detection value of the temperature detection unit 6 such that the detection value does not exceed a predetermined temperature.

According to the above-described configuration, the turbine blade 1 is subjected to quenching processing in a state where the leading edge of the turbine blade 1 is sandwiched by the U-shaped portion 31 of the induction heating coil 3. Accordingly, in comparison with a case where local quenching processing is repeated, quenching can be finished more uniformly.

Furthermore, the temperature detection unit 6 is configured to detect the temperature of the vicinity of the induction heating coil 3 in a non-contact manner. As a result, the influence of the temperature detection unit 6 itself on the detection value can be suppressed in comparison with a case where the temperature is detected by, for example, a contact type device. That is, it is possible to achieve an increase in detection accuracy.

In addition, the control device 90 controls the magnitude of a high-frequency electrical current supplied to the induction heating coil 3 based on the detection value of the temperature detection unit 6. Therefore, it is possible to reduce a probability that the heating temperature of the induction heating coil 3 becomes excessively high.

(2) In the high-frequency hardening apparatus 100 according to a second aspect, the temperature detection unit 6 detects the temperature of a portion of the leading edge EL that is on the convex side of the turbine blade 1 and that is surrounded by the U-shaped portion 31 and the linear portion 32.

According to the above-described configuration, the temperature of a portion where the heating temperature of the induction heating coil 3 is highest can be obtained as the detection value. The control device 90 controls the amount of electrical current supplied to the induction heating coil 3 such that the detection value does not exceed a predetermined value. Therefore, it is possible to further reduce a probability that the heating temperature of the induction heating coil 3 becomes excessively high.

(3) In the high-frequency hardening apparatus 100 according to a third aspect, the turbine blade 1 is twisted in a circumferential direction around the blade height direction Dh from one side toward the other side in the blade height direction Dh, and the high-frequency hardening apparatus 100 further includes the rotating mechanism 5 that maintains a relative distance between the leading edge EL and the induction heating coil 3 by rotating the turbine blade 1 around the rotation axis Ax extending in the blade height direction Dh as the turbine blade 1 and the induction heating coil 3 move relative to each other in the blade height direction Dh.

According to the above-described configuration, in a case where the turbine blade 1 has a three-dimensionally twisted shape, the turbine blade 1 can be rotated around the rotation axis Ax extending in the blade height direction Dh by the rotating mechanism 5. Accordingly, it is possible to maintain a relative distance between the induction heating coil 3 and the leading edge EL without moving the induction heating coil 3 itself. Therefore, the heating temperature can be controlled with a higher accuracy.

(4) In the high-frequency hardening apparatus 100 according to a fourth aspect, the temperature detection unit 6 is an optical fiber type radiation temperature sensor.

According to the above-described configuration, since the temperature detection unit 6 is an optical fiber type radiation temperature sensor, the temperature detection unit 6 is less likely to be influenced by an induced electrical current generated by the induction heating coil 3. Accordingly, temperature detection of the temperature detection unit 6 can be realized with an even higher accuracy.

(5) The high-frequency hardening apparatus 100 according to a fifth aspect further includes the alarm temperature detection unit 7 that is provided separately from the temperature detection unit 6 and that detects a temperature distribution in a range on the leading edge EL that is wider than a temperature detection target range of the temperature detection unit 6, and the electrical current controller 85 is configured to issue an alarm in a case where the temperature distribution detected by the alarm temperature detection unit 7 includes a value higher than a predetermined alarm threshold value.

According to the above-described configuration, the alarm temperature detection unit 7 is provided in addition to the temperature detection unit 6. The alarm temperature detection unit 7 detects a temperature distribution in a wider range than the temperature detection unit 6. The control device 90 issues an alarm in a case where the temperature distribution includes a value higher than the alarm threshold value. That is, in the above-described configuration, in a case where the heating temperature of the induction heating coil 3 becomes excessively high even in just a part, a warning can be issued to the administrator not to perform further heating. Accordingly, quenching processing can be performed on the turbine blade more uniformly and more accurately.

(6) In the high-frequency hardening apparatus 100 according to a sixth aspect, the turbine blade 1 includes the black coating film Lb that is formed at least on the leading edge EL and that is formed of a black paint, and the temperature detection unit 6 is configured to detect the temperature of a surface of the black coating film Lb.

According to the above-described configuration, the black coating film Lb is formed on the surface of the turbine blade. The temperature detection unit 6 detects the temperature of a surface of the black coating film Lb. Accordingly, in comparison with a case where, for example, a metallic material is exposed at the surface of the turbine blade 1, a variation in emissivity of heat from the surface can be suppressed. Accordingly, temperature detection can be performed with an even higher accuracy.

(7) In the high-frequency hardening apparatus 100 according to a seventh aspect, the linear portion 32 extends along a surface of the turbine blade 1 to be parallel with the U-shaped portion 31.

According to the above-described configuration, a region surrounded by the linear portion 32 and the U-shaped portion 31 is formed on the surface of the turbine blade 1. Accordingly, a high-temperature state is maintained in the surrounded region. Accordingly, quenching processing can be performed efficiently and uniformly.

(8) In the high-frequency hardening apparatus 100 according to an eighth aspect, the U-shaped portion 31 is configured to sandwich the turbine blade 1 by one-third of a distance from the leading edge EL in a chord direction of the turbine blade 1.

In the case of the turbine blade 1, erosion is likely to occur particularly at one-third of a portion from the leading edge EL in a chord direction. According to the above-described configuration, it is possible to actively perform quenching processing on such a portion. Accordingly, the turbine blade 1 having an even higher durability can be obtained.

REFERENCE SIGNS LIST

100: high-frequency hardening apparatus
1: turbine blade
11: blade body
11T: tip
12: blade root
12S: serration
2: stand
21: stand body
22: fixation member
3: induction heating coil 31: U-shaped portion
32: linear portion
33: connecting portion
4: moving mechanism
41: rail
42: first moving portion
43: second moving portion
5: rotating mechanism
6: temperature detection unit
61: supporting part
7: alarm temperature detection unit
8: electrical current supply unit
90: control device
81: controller
82: storage unit
83: determination unit
84: movement controller
85: electrical current controller
91: CPU
92: ROM
93: RAM
94: HDD
95: I/O
Ax: rotation axis
C: iron core
Dh: blade height direction
EL: leading edge
ET: trailing edge
Lb: black coating film
P: detection point
Sn: convex surface
Sp: concave surface

The invention claimed is:

1. A high-frequency hardening apparatus comprising:
an induction heating coil that includes a U-shaped portion that sandwiches a leading edge of a turbine blade, a pair of linear portions that sandwiches the turbine blade, and a connecting portion that connects the U-shaped portion and the linear portions to each other on a convex side and a concave side of the turbine blade;
a temperature detection unit that detects a temperature in a first range of the leading edge of the turbine blade in a vicinity of the induction heating coil in a non-contact manner;
a moving mechanism that moves the turbine blade and the induction heating coil relative to each other in a blade height direction of the turbine blade;
an electrical current supply unit that supplies a high-frequency electrical current to the induction heating coil;
a control device that includes an electrical current controller, the electrical current controller controlling a magnitude of the high-frequency electrical current from the electrical current supply unit based on a detection value of the temperature detection unit such that the detection value does not exceed a predetermined temperature; and
an alarm temperature detection unit that is provided separately from the temperature detection unit and that detects a temperature distribution in a second range, the second range including the first range in which the temperature detection unit detects the temperature of the leading edge, the second range being wider than the first range,
wherein the electrical current controller is configured to issue an alarm in a case where the temperature distribution detected by the alarm temperature detection unit includes a value higher than a predetermined alarm threshold value.

2. The high-frequency hardening apparatus according to claim 1,
wherein the temperature detection unit detects a temperature of a portion of the leading edge that is on the convex side of the turbine blade and that is surrounded by the U-shaped portion and the linear portion.

3. The high-frequency hardening apparatus according to claim 1,
wherein the turbine blade is twisted in a circumferential direction around the blade height direction from one side toward the other side in the blade height direction, and
the high-frequency hardening apparatus further comprises a rotating mechanism that maintains a relative distance between the leading edge and the induction heating coil by rotating the turbine blade around a rotation axis extending in the blade height direction as the turbine blade and the induction heating coil move relative to each other in the blade height direction.

4. The high-frequency hardening apparatus according to claim 1,
wherein the temperature detection unit is an optical fiber type radiation temperature sensor.

5. The high-frequency hardening apparatus according to claim 1,
wherein the turbine blade includes a black coating film that is formed at least on the leading edge and that is formed of a black paint, and
the temperature detection unit is configured to detect a temperature of a surface of the black coating film.

6. The high-frequency hardening apparatus according to claim 1,
wherein the linear portion extends along a surface of the turbine blade to be parallel with the U-shaped portion.

7. The high-frequency hardening apparatus according to claim 1,
wherein the U-shaped portion is configured to sandwich the turbine blade by one-third of a distance from the leading edge in a chord direction of the turbine blade.

8. The high-frequency hardening apparatus according to claim 1,
wherein the moving mechanism includes a rail extending in the blade height direction, a first moving portion that is movable along the rail and extends upward from the rail, and a second moving portion supported so as to be movable in a vertical direction along the first moving portion.

9. The high-frequency hardening apparatus according to claim 8,
wherein the induction heating coil is supported by the second moving portion.

10. The high-frequency hardening apparatus according to claim 9,
wherein the temperature detection unit is fixed with respect to second moving portion directly or via a supporting part, and
the temperature detection unit is movable relative to the turbine blade together with the induction heating coil.

* * * * *